A. E. ALCHIN.
MACHINE FOR CUTTING BLOCKS OF ICE CREAM INTO BRICKS.
APPLICATION FILED JULY 2, 1918.
1,330,154. Patented Feb. 10, 1920.
2 SHEETS—SHEET 2.
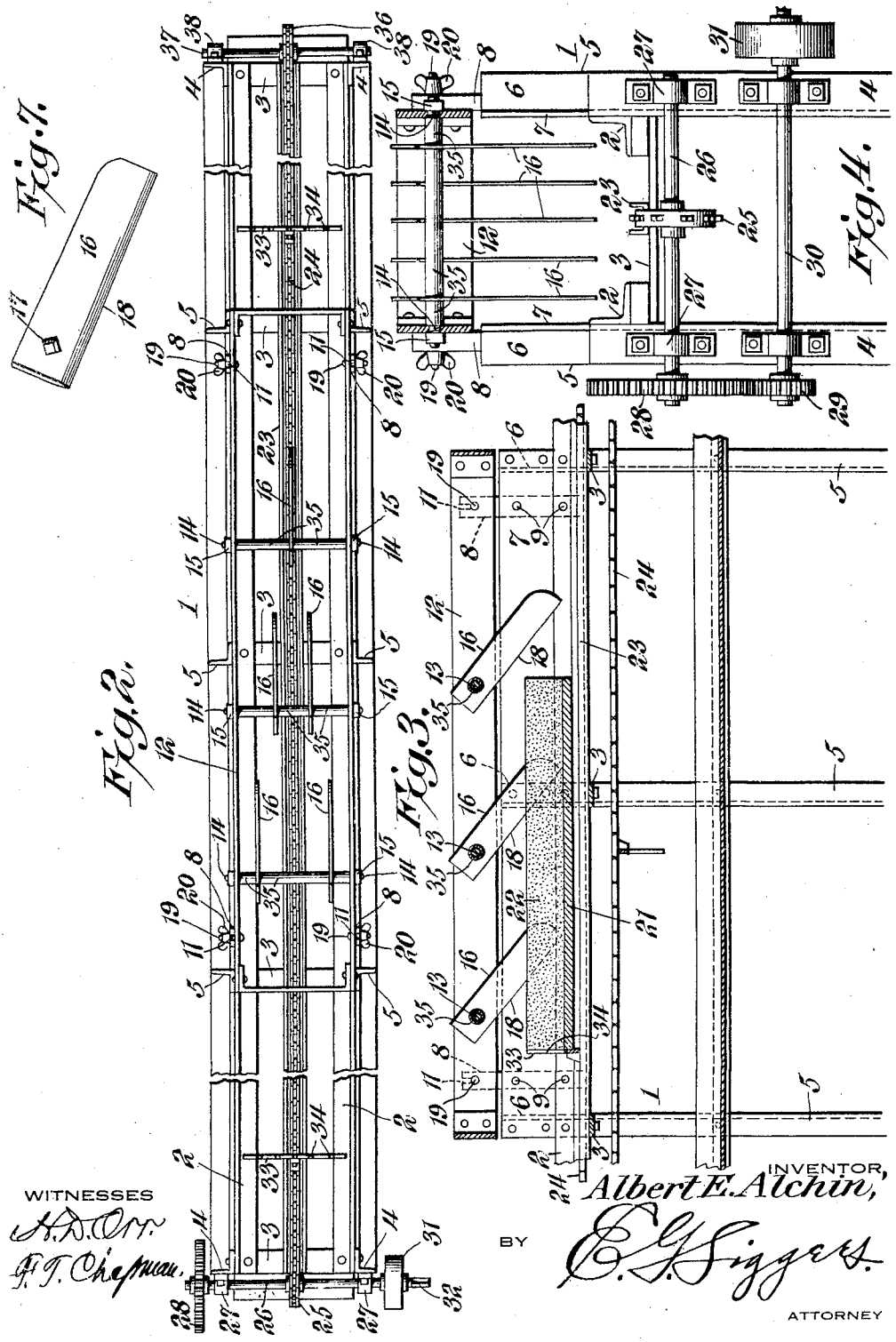
WITNESSES
H. D. Orr.
F. T. Chapman.
INVENTOR,
Albert E. Alchin,
BY
C. G. Siggers.
ATTORNEY

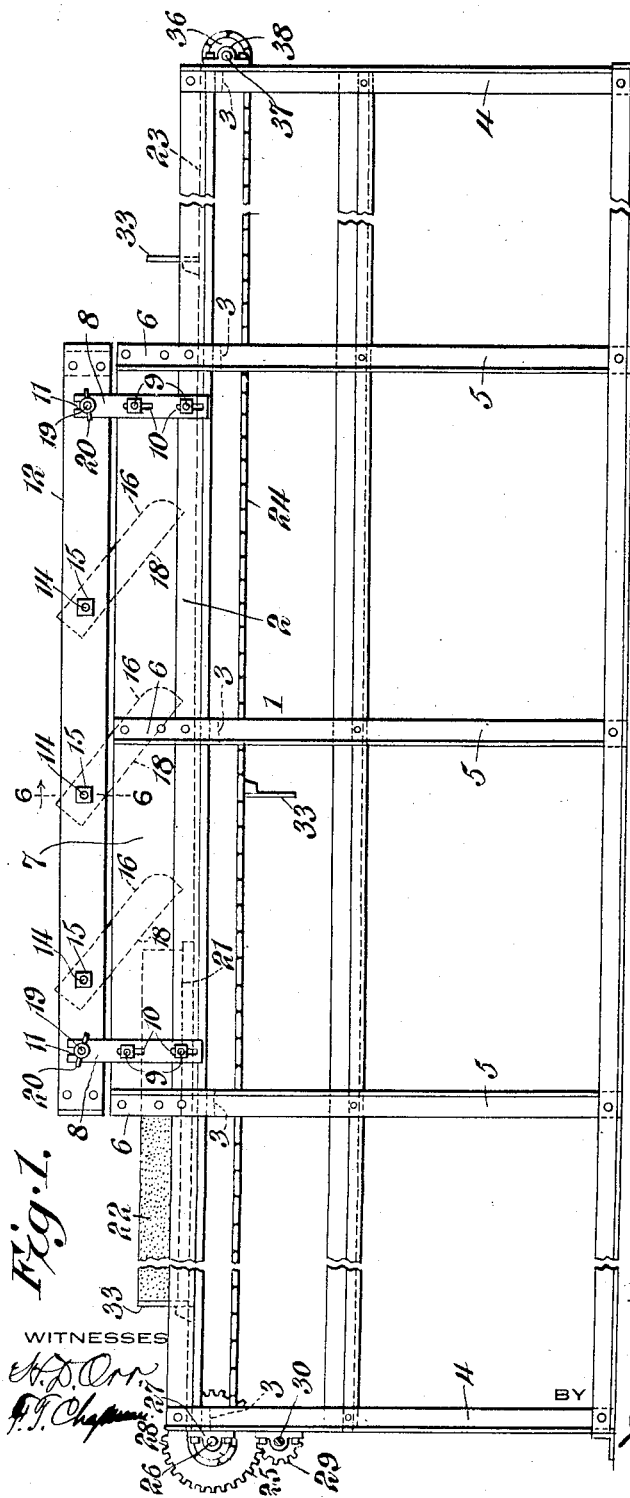

UNITED STATES PATENT OFFICE.

ALBERT ERNEST ALCHIN, OF PERTH AMBOY, NEW JERSEY.

MACHINE FOR CUTTING BLOCKS OF ICE-CREAM INTO BRICKS.

1,330,154.

Specification of Letters Patent.

Patented Feb. 10, 1920.

Application filed July 2, 1918. Serial No. 242,980.

*To all whom it may concern:*

Be it known that I, ALBERT E. ALCHIN, a subject of the King of Great Britain, residing at Perth Amboy, in the county of Middlesex and State of New Jersey, have invented a new and useful Machine for Cutting Blocks of Ice-Cream into Bricks, of which the following is a specification.

This invention has reference to a machine for cutting blocks of ice cream into bricks, and its object is to expeditiously and rapidly divide the large block into bricks of the desired size ready for wrapping.

In the practice of the invention, the ice cream is first formed into large rectangular blocks of appropriate width, length and thickness, it being customary to make the blocks of a size to include eight quarts of ice cream, although, of course, such size is not obligatory. The length of the block is considerably greater than the width while the thickness of the block will represent the width of the finished brick, say about three inches.

The block is caused to move, by appropriate mechanism, against a series of knives or cutters arranged in most part in pairs with the pairs spaced apart in the direction of the travel of the block and the knives or cutters of the pairs spaced apart on lines perpendicular to the line of travel. The cutters of the first pair to engage the block are most widely spaced and the other pair or pairs are arranged progressively closer together widthwise of the block being cut, while, in the event of an uneven number of knives, the last one to engage the block is arranged in the center line of travel. The result is that the block is divided into strips in number one greater than the knives or cutters. Usually the cuts are first made lengthwise of the block and then by presenting the already cut block to another series of knives appropriately arranged, the strips are divided into bricks ready for wrapping.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a side elevation of a machine for severing an elongated block of ice cream into lengthwise strips.

Fig. 2 is a plan view of the structure shown in Fig. 1.

Fig. 3 is a longitudinal section of that portion of the machine of Fig. 1 carrying the knives.

Fig. 4 is an end elevation of the machine of Fig. 2, as seen from the left hand end, the frame carrying the knives being shown in cross section and the sprocket chain shown in Figs. 1, 2 and 3 being omitted.

Fig. 5 is a perspective view of a small portion of the conveyer chain and one of the slotted flights thereon.

Fig. 6 is a section on the line 6—6 of Fig. 1, drawn on a larger scale and omitting distant parts and certain adjacent parts.

Fig. 7 is a perspective view of one of the knives or cutters.

Referring to the drawings, there is shown a frame 1 comprising longitudinal beams 2, which may be of angle material, and these beams are connected by cross bars 3 and supported upon legs or uprights 4 and 5. The upper ends of the legs 5 rise above the beams 2, as indicated at 6 in Figs. 1, 3 and 4, and are there joined by side plates 7 providing means for holding certain parts.

Near the ends of each side plate 7 are erected bars 8, each held to the side plate by bolts 9 passed through slots 10 in each bar elongated in the direction of the length of the bar, which bar rises above the respective side plate 7. The extent of rise of each bar 8 above the sides of the side plate 7 may be regulated by loosening the bolts 9 and moving the bars up or down, after which they may be securely fastened in their new positions by tightening the bolts 9. At the upper end of each bar 8 is a recess 11.

There is also provided a frame 12 of a length corresponding to about the distance between the end ones of the legs 5 and of a width about equal to the spacing of the plates 7 from each other crosswise of the machine.

Traversing the sides of the frame 12 are rods 13 which, between the sides of the frame 12, are or may be of square cross section. The rods 13 have rounded and screw-threaded extremities 14 projecting through the sides of the frame 12 and outside thereof receiving nuts 15 whereby the rods may be firmly clamped in the frame.

Fitting the squared rods 13 are blades or cutters 16, each with a square hole 17 preventing the blade from turning on the rod, and each blade has a sharpened edge 18. The frame 12 is provided with bolts or pintles 19 capable of seating in the recesses or sockets 11 and each bolt is provided with a wing nut 20 as a convenient means for holding the frame in place and permitting the ready removal of the frame without the necessity of using screws, by simply turning the wing nuts 20 by hand.

The longitudinal members 2 of the frame have each one web upright and the other web horizontal so as to form tracks for a board 21 on which the block 22 of ice cream to be divided into bricks is placed.

Supported by the cross pieces 3 is a channel beam 23 with the channel opening upwardly to constitute a supporting guide member for an endless sprocket chain 24 passed at one end of the machine about a sprocket wheel 25 mounted on a shaft 26 carried by journal bearings 27 on the corresponding legs 4 of the frame. The shaft 26 is provided at one end with a gear wheel 28 with which meshes a pinion 29 on another shaft 30 constituting the drive shaft of the machine. The shaft 30 carries a pulley 31 and has one end squared, as shown at 32, for the application of a crank, so that the machine may be either manually driven or power driven as may be desired.

Carried by the sprocket chain 24, at suitable intervals, are flights 33 best shown in Fig. 5, each flight comprising a plate with entering slots or recesses 34 reaching from the edge of the flight remote from the chain to a point a little more than the distance of the ice-cream-supporting face of the board from the sprocket chain when the board is on the horizontal flanges of the side members 2 of the frame.

The knives or cutters 16 are set at a slant between the horizontal and vertical with those ends of the knives or cutters remote from the bars 13 so positioned as to either just engage or slightly clear the board 21 when traveling beneath the cutters.

In the particular arrangement shown in the drawings, it is intended that the block 22 be cut into six strips lengthwise of the block, five knives or cutters being employed for the purpose. The knives are arranged in two pairs with one pair spaced behind the other in the direction of travel by an appropriate distance and one knife is set in the center line of travel and is spaced behind the second pair of knives by a distance about equal to the spacing of the second pair of knives from the first pair thereof. Moreover, the first pair of knives is more widely spaced than the second pair and the spacing of the knives is such that the cuts produced by the knives are equally spaced from each other and from the sides of the block to be severed into bricks.

It is customary to freeze the ice cream into blocks of about the size hereinbefore stated and these blocks are kept in cold storage until wanted. In the operation of the machine the block 22 is placed upon the board 21 and such board with the block of cream thereon is placed upon the angle beams 2 so as to be in the path of a plate or abutment 33, which latter, when it engages the board, causes the board and its load of cream to travel toward the knives 16 in its path. Such block of cream is first engaged by the more widely separated knives and corresponding cuts are made in the block so that the two forward and more widely spaced knives separate marginal strips from the block being cut. After the first pair of knives in order have entered the block for an appropriate distance the second pair of knives engage the block and sever two more strips of the same width as the outer strips but closer to the center line of the block. Finally the block is engaged by the last one of the series of knives, which is placed in the center line of the moving block, engaging the latter when the first pair of knives has nearly completed the cuts made thereby.

The result is that, in the machine illustrated, the traveling block of ice cream is progressively severed into six strips of equal thickness, which thickness corresponds to the thickness of the ultimately produced bricks, each strip representing several bricks to be thereafter completed by another machine in all respects similar to that shown in the drawings, except that it is able to take the board 21 and already cut block 22 with the direction of the length of the block widthwise of the machine.

The mechanism shown in the drawings is arranged to sever an elongated block of ice cream into longitudinal strips, and since the severing of such strips still associated in block form into the smaller bricks is in all respects similar to the cutting of the bricks into long strips, it is deemed unnecessary to show such arrangement, since it simply means a machine of greater width provided with a greater number of knives or cutters. For instance, if it be desired to produce twenty-four bricks to the gallon from a block containing eight quarts or two gallons, and the strips into which the block is first divided are six in number, then these strips are divided into eight pieces so that a total number of bricks cut are forty-eight. It is therefore apparent that the second or transverse series of cuts will require seven knives where the longitudinal cuts require five knives.

The operation of the machine may be made continuous by replacing each board 21 as soon as it has passed beyond the frame 12 with another board 21 and ice cream block 22 placed upon the conveyer structure in position to be engaged by a flight 23 so as to reach the knives 16 soon after the first block leaves the knives.

By arranging the knives to give a slanting or shear cut the cutting is rendered relatively easy and all tearing or bunching of the cream is avoided. The resistance of the knives or cutters to the movement of the cream is so slight that the cream is readily held on the board 21 by the flight or abutment 33 engaging the rear end thereof. The slots 34 are properly spaced to permit the knives 16 to pass through them.

By providing a suitable number of frames 12 each with knives 16 suitably secured thereon at the proper angle and spacing, the machine may be readily adjusted for dividing the block 22 up into a different number of bricks than that for which it may be first set. Of course, the frame 12 is not necessarily a separate part of the machine, since it may be made an integral part and the rods 13 be removed and other settings of the knives or cutters provided as desired.

In order that the knives or cutters 16 may be held in proper spaced relation on the rods 13, spacing sleeves 35 are applied to each rod 13 between the knives thereon and also between the knives themselves and the sides of the frame 12, whereby the parts are clamped tightly together to perform the cutting operation without displacement.

That end of the sprocket chain 24 remote from the driving sprocket 25 is carried about another sprocket wheel 36 in turn carried by a shaft 37 at the discharge end of the machine, the shaft 37 being mounted in journal bearings 38 with the sprocket wheel 36 performing the functions of an idler sprocket wheel.

The invention is not confined to any particular relation of the cutters and ice-cream blocks in producing the cuts, but it is preferred that the blocks travel and the knives be stationary.

The wedge or V arrangement of the knives or cutters, with the blunt end of the wedge forward and first engaging the ice-cream block, causes the first cuts to be made near both sides or ends, as the case may be, of the block, while the succeeding cuts are made nearer to the center line of travel of the block.

What I claim is:

1. A machine of the class described, comprising a carrier for the block of material to be cut, and a series of flat stationary inclined knives or cutters each having its cutting edge located and sufficiently extended to cut through the block, the number of knives or cutters in a line transverse to the line of cut being less than the whole number of knives or cutters.

2. A machine of the class described, comprising a carrier for the block of material to be cut and a series of knives or cutters each in the form of a thin flat blade, with its cutting edge located and sufficiently extended to sever the block, the series of knives or cutters being arranged in wedge formation with the blunt edge of the wedge foremost.

3. A machine of the class described comprising a movable carrier for the block of material to be cut, and a series of pairs of fixed slanting flat knives or cutters, with the knives of each pair spaced apart widthwise of the line of cut of the series and also lengthwise of the line of cut, the knives of the pairs being progressively closer together toward the rear end of the series, the last knife being in the longitudinal center of the carrier.

4. A machine of the class described, comprising a carrier for the block of material to be cut, and a series of flat stationary, slanting, knives or cutters, each in the form of an elongated blade with one long edge sharpened and of a length to cut through the block and spaced both widthwise and lengthwise of the line of cut.

5. A machine of the class described, the combination with a carrier for the block of material to be cut, of a series of flat knives or cutters each of a length to cut through the block, said knives or cutters being arranged in stepped order in the direction of cut.

6. A machine of the class described, the combination with a support for the block of material to be cut, of a series of cutting blades arranged in stepped order in the direction of cut and approaching the center line of travel from the opposite sides thereof, said blades each having a forward cutting edge of a length to sever the block and set at a slant from top to bottom to the line of progression through the block whereby to produce a shear cut through the block.

7. A machine of the class described, comprising a traveling carrier for the block of material to be cut, and a series of flat cutting blades rigidly mounted with respect to the line of travel of the carrier, with the blades arranged in stepped order in the direction of cut and approaching the center line of travel from opposite sides thereof, and also having cutting edges slanting to produce shear cuts and of a length to extend through the block, the carrier having a plane course of travel where passing the series of blades.

8. A machine of the class described, comprising a main frame having tracks, an endless conveyer with spaced vertically slotted flights, boards movable on the tracks, said boards supporting the block of material to be cut and being engaged by the flights, and a series of blades rigidly supported in the path of the block of material and set to traverse the block at an acute angle to the plane of travel thereof and in wedge formation, with the blunt end of the wedge foremost, the blades each being of a length to sever the block to the board, and the conveyer having a plane course of travel with respect to the knives.

9. A machine of the class described, comprising a frame, a conveyer for the material to be cut, a series of knives or cutters for engaging and severing the material, and carrying means for the knives comprising a frame in which the knives are secured and supports on the first-named frame, with readily removable and adjustable connections between the supports and the knife-carrying frame, whereby knife-carrying frames with different arrangements of knives may be substituted for each other at will.

10. A machine of the class described, comprising supporting means for a board carrying the block of material to be cut, a conveyer for the board having a flight engaging one end of the board and slotted from its upper edge downwardly to the board, and a series of thin flat severing blades for the block arranged in wedge formation with the blunt end of the wedge forward, each blade slanting rearwardly to produce a shear cut and of a length to cut through the block to the board supporting the block.

11. In a machine of the class described, a main frame, bars detachably secured to and upstanding from the main frame and extending above the latter, another frame having means for detachably securing it to the bars above the main frame, and a series of stationary blades or cutters carried by the second-named frame, whereby knife-carrying frames with different arrangements of knives may be substituted for each other at will.

12. In a machine of the class described, a main frame, bars upstanding from the main frame and extending above the latter, another frame having means for securing it to the bars above the main frame, and a series of blades or cutters carried by the second-named frame in a position when on the machine to sever material presented to them, their bars supporting the second-named frame having means for their up-and-down adjustment and for locking the bars in the adjusted positions.

13. In a machine of the class described, a main frame, bars detachably secured to and upstanding from the main frame, a series of knives or cutters in the form of elongated blades with one long edge sharpened, a frame having means for securing it to the bars above the main frame and carrying the blades and provided with rods extending from side to side of the frame and of non-circular cross section, and securing means for the rods holding them against rotative movement in the frame, the blades having passages for the rods of non-circular cross section to hold the blades in fixed relation to the rods.

In testimony that I claim the foregoing as my own, I have hereto affixed my signature.

ALBERT ERNEST ALCHIN.

Witnesses:
FERD. GARRETSON,
FRED. H. WALKER.